Feb. 7, 1961 L. J. HEATON-ARMSTRONG 2,971,059

AUTOMATIC FREQUENCY CONTROL ARRANGEMENTS
FOR FREQUENCY SHIFT TELEGRAPH RECEIVERS

Filed Sept. 27, 1956 4 Sheets-Sheet 1

Inventor
L.J.HEATON-ARMSTRONG
By Robert Harding Jr.
Attorney

Inventor
L.J.HEATON-ARMSTRONG
By Robert Harding Jr.
Attorney

TABLE I

| CARRIER WAVE FREQUENCY | CONDITION OF | |
|---|---|---|
| | CHANNEL A | CHANNEL B |
| f1 = f − 600 cps. | SPACE | SPACE |
| f2 = f − 200 cps. | SPACE | MARK |
| f3 = f + 200 cps. | MARK | SPACE |
| f4 = f + 600 cps. | MARK | MARK |

TABLE II

| FREQENCY | KILOCYCLES PER. SEC. |
|---|---|
| f1 | 99·4 |
| f2 | 99·8 |
| f3 | 100·2 |
| f4 | 100·6 |

TABLE III

| FREQUENCY KILOCYCLES PER. SEC. | OUTPUT OF 20 VOLTS | FREQUENCY OF 18 KILOCYCLES PER SEC |
|---|---|---|
| f1 = 99·4 | −45 | 69·4 |
| f2 = 99·8 | −15 | 69·8 |
| f3 = 100·2 | +15 | 70·2 |
| f4 = 100·6 | +45 | 70·6 |

FIG.4.

Inventor
L.J. HEATON-ARMSTRONG
By Robert Harding Jr.
Attorney

Feb. 7, 1961 L. J. HEATON-ARMSTRONG 2,971,059

AUTOMATIC FREQUENCY CONTROL ARRANGEMENTS FOR FREQUENCY SHIFT TELEGRAPH RECEIVERS

Filed Sept. 27, 1956 4 Sheets-Sheet 4

INVENTOR.
L. J. HEATON-ARMSTRONG

BY C. H. Suydam
AGENT

United States Patent Office 2,971,059

Patented Feb. 7, 1961

2,971,059

AUTOMATIC FREQUENCY CONTROL ARRANGEMENTS FOR FREQUENCY SHIFT TELEGRAPH RECEIVERS

Louis John Heaton-Armstrong, London, England, assignor to International Standard Electric Corporation, New York, N.Y., a corporation of Delaware Filed Sept. 27, 1956, Ser. No. 612,475

Claims priority, application Great Britain Oct. 4, 1955

7 Claims. (Cl. 178—88)

The present invention relates to automatic frequency control arrangements for frequency-shift telegraph receivers for the twinplex telegraph system.

One form of the twinplex system is described in an article by Christopher Buff on page 20 of "Electrical Communication," March 1952. This system provides two telegraph channels, and in order to indicate the marking or spacing condition of each channel, the transmitter sends out at any instant a carrier wave having one of four given frequencies each of which corresponds to one of the four possible combinations of the conditions of the two channels at the instant concerned. The receiver identifies the frequency of the carrier wave being transmitted and translates it into the corresponding conditions in the receiving circuits of the two channels. One method of carrying out this translation is given in the above-mentioned article, and a different method is described below. Whatever the method used, however, uncertainty of operation is liable to result from small variations in the carrier wave frequencies or in the frequencies of local oscillators used in the receiver.

The principal object of the invention, therefore, is to provide automatic frequency control arrangements in the receiver suitable for the special conditions of the twinplex system.

This object is achieved according to the invention by providing a receiver for a twinplex telegraph system of the kind in which the marking or spacing condition of each of two telegraph channels at any instant is indicated by a carrier wave having a corresponding one of four different frequencies, comprising means for identifying the frequency of a received carrier wave, means controlled in response to the result of the identification for setting up the corresponding marking or spacing conditions in each of two channel output circuits, and means controlled by the conditions set up in the said output circuits for stabilising the frequency of the corresponding received carrier wave.

The invention also provides a receiver for a twinplex telegraph system of the kind in which the marking or spacing condition of each of two telegraph channels at any instant is indicated by transmitting a carrier wave having a corresponding one of four different frequencies, comprising a first frequency changer for translating the frequency of a received carrier wave to a corresponding one of four given intermediate frequencies, means controlled by the intermediate frequency wave for setting up the corresponding marking or spacing condition in each of two channel output circuits, and means for controlling the said first frequency changer in response to the cconditions set up in the said output circuits in such manner that the frequencies of the intermediate frequency waves are substantially independent of variations of the frequencies of the corresponding received carrier waves.

The invention will be described with reference to the accompanying drawings, in which:

Fig. 4 shows there tables used in the explanation of the invention;

In order that the invention may be clearly understood, it will be assumed that the frequencies of the carrier wave sent out by the transmitter in response to marking or spacing conditions of the two channels A and B are given in Table I, Fig. 4, in which "c.p.s." stands for "cycles per second." In Table 1 the frequency $f$ can have any convenient value and will be called the "mean carrier frequency." It will be understood that it is not essential that the frequency shifts should have the particular values given in Table I.

Since the invention is concerned with the receiver only, no details of the transmitter will be given. It is only necessary to know what frequencies it sends out.

It will be assumed for clearness that in the marking condition of a channel, a positive potential is applied to the channel conductor, and in the spacing condition the potential is negative. This is however not essential; the opposite conditions could be used, or a single current arrangement.

Figures 1, 2:
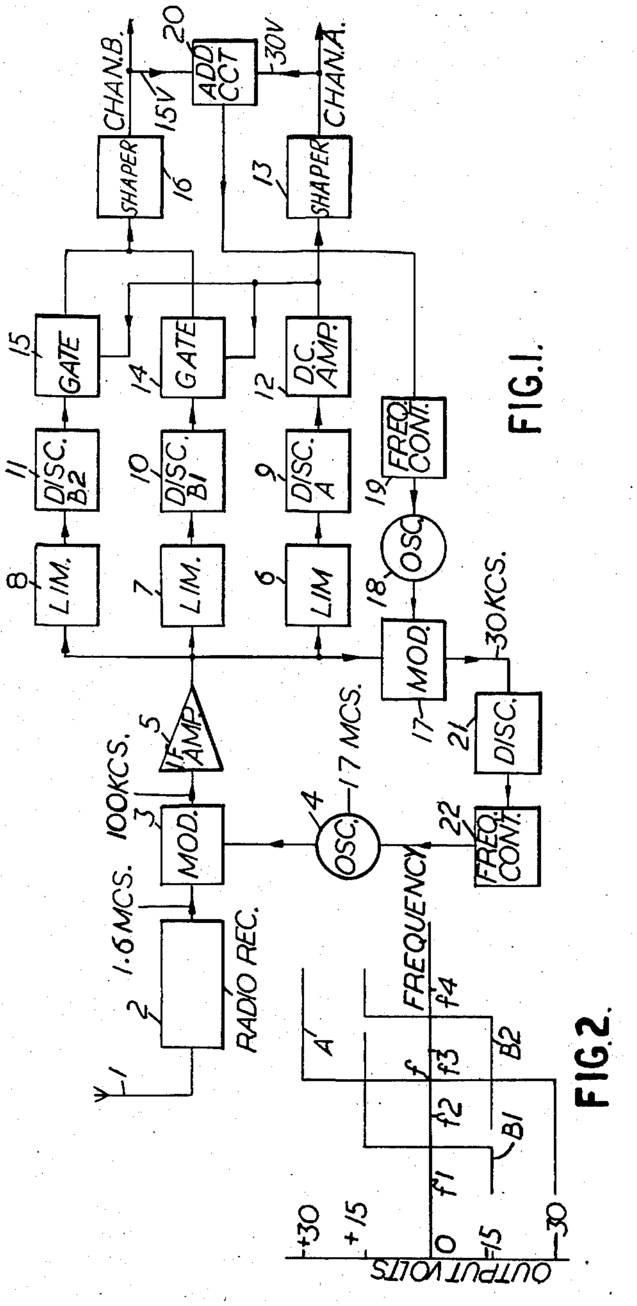
Fig. 1 shows a block schematic circuit diagram of an embodiment of the invention.
Fig. 2 shows graphical diagrams used in explaining the operation of Fig. 1.

One form of the receiver according to the invention is shown in Fig. 1. Particular frequencies will be specified for clearness, but it will be understood that other values could be used. The incoming carrier waves are received by an antenna 1 connected to a radio frequency receiver 2 including conventional amplifiers and frequency changers designed to reduce the mean carrier frequency to a first mean intermediate frequency of 1.6 megacycles per second, for example. The receiver 2 is connected to a frequency changing modulator 3 to which is connected a local oscillator 4 designed to provide a frequency of 1.7 megacycles per second. The lower sideband is selected from the modulator 3, so that the second mean intermediate frequency is 100 kilocycles per second. Thus at the output of the modulator 3, the four carrier frequencies $f1$ to $f4$ are given in Table II, Fig. 4.

The carrier waves at the output of the modulator 3 are supplied through an amplifier 5 to three parallel paths comprising three amplitude limiters 6, 7 and 8, and frequency discriminators 9, 10 and 11, which will be referred to as the A, B1 and B2 discriminators, respectively. The A discriminator 9 is connected through a direct current amplifier 12 and a pulse shaping circuit 13 to the output circuit of channel A. The B1 and B2 discriminators 10 and 11 are connected through respective gating circuits 14 and 15 and through a pulse shaping 16 to the output circuit of channel B. The gating circuits 14 and 15 are controlled from the output of the amplifier 12, which should be designed to produce an output voltage which is double the input voltage.

Before describing the automatic frequency control arrangements according to the invention, the operation of the receiver circuit described so far will be explained.

The A discriminator 9 should be designed to produce a zero output voltage at the second mean intermediate carrier frequency $f$ (100 kilocycles per second), and positive and negative output voltage for frequencies respectively higher and lower than $f$. It should further be provided with output amplifying and limiting circuits to give it the substantially rectangular characteristic, taken at the output of the amplifier 12, indicated by the graph A of Fig. 2. Such arrangements are conventional and need not be described in detail. For clearness it will be assumed that the A discriminator produces after amplification a unidirectional output voltage V of +30 volts for frequencies $f3$ and $f4$ and −30 volts for frequencies $f1$ and $f2$. The B1 and B2 discriminators 10 and 11 are similar to the A discriminator except that their characteristic curves are given respectively by graphs B1 and B2 in Fig. 2, in which zero voltage output occurs at frequencies $(f1+f2)/2$ and $(f3+f4)/2$, respectively, and in which the output voltage is +15 volts $(V/2)$ at $f2$ and $f4$, respectively, and −15 volts at $f1$ and $f3$, respectively, there being no amplifier corresponding to 12.

Reference to Table I shows that when the received frequency is $f3$ or $f4$ a marking condition is indicated for channel A, and when the received frequency is $f1$ or $f2$ a spacing condition is indicated. Reference to graph A of Fig. 2 shows that the A discriminator 9 (Fig. 1) produces a positive output voltage in the first case and a negative output voltage in the second case, and thus produces directly the proper conditions for channel A. Table I also shows that $f2$ or $f4$ indicates a marking condition for channel B and $f1$ or $f3$ a spacing condition. It will be clear from graph B1 of Fig. 2, that if the incoming frequency is $f1$ or $f2$, the B1 discriminator 10 will produce the required condition on the output circuit of channel B provided that the gate 14 is open, but it will also produce a marking condition at frequency $f3$, which is incorrect. Therefore the amplified positive voltage produced by the A discriminator 9 at frequency $f3$ is applied to shut the gate 14 so that the B1 discriminator 10 is then disconnected from channel B. However when frequency $f3$ or $f4$ is received, the B2 discriminator 11 produces the desired conditions for channel B and so the amplified positive voltage produced by the A discriminator 9 at $f3$ or $f4$ is applied to open the gate 15. As the B2 discriminator produces the wrong condition at frequency $f2$, gate 15 is shut by the amplified negative potential produced by the A discriminator 9 at $f2$. Thus it will be seen that for frequencies $f1$ and $f2$, gate 14 is open and gate 15 is shut, and for frequencies $f3$ and $f4$ gate 14 is shut and gate 15 is open.

Figure 5:
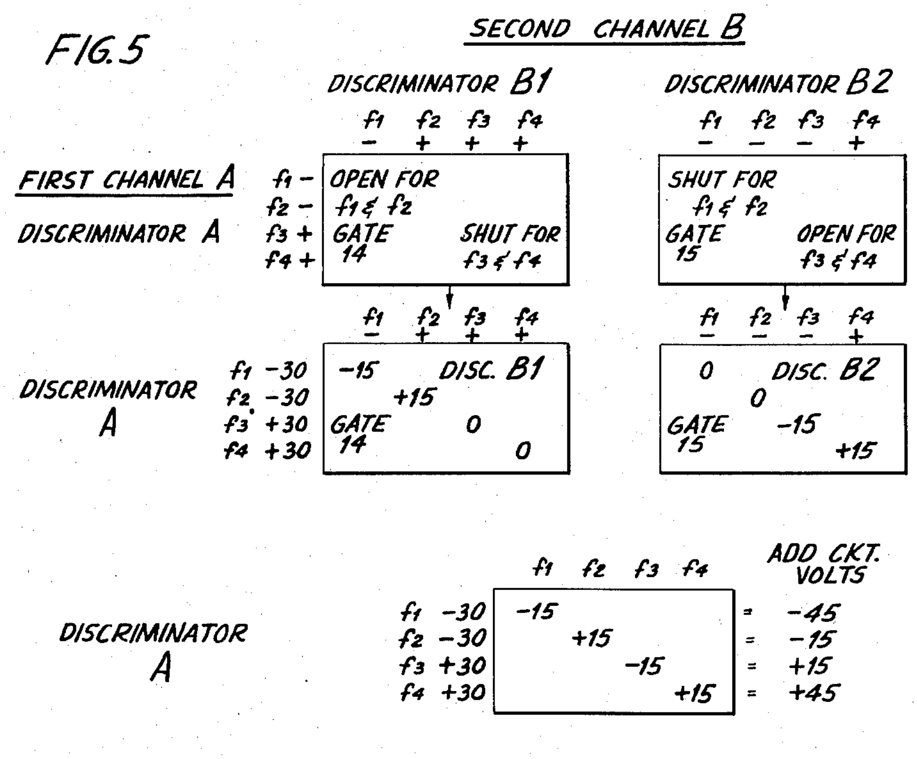
Fig. 5 shows a chart used in explaining the operation of the invention.
Figures 6A, 6B:
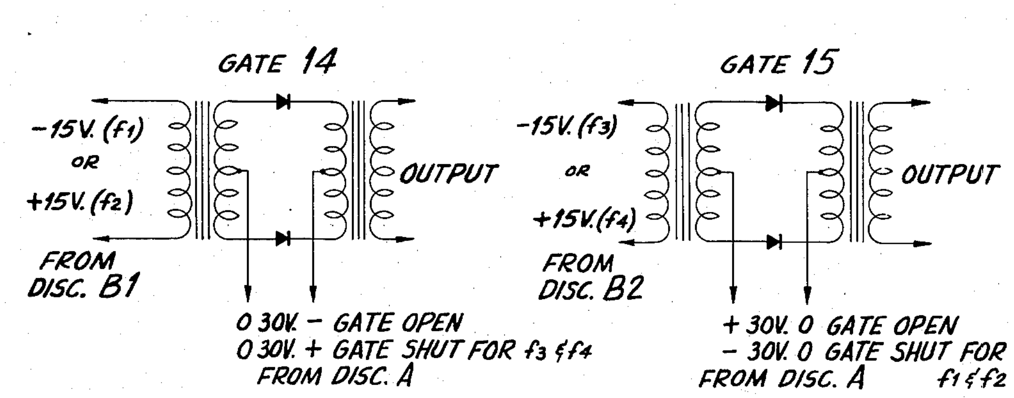
Figures 6A and 6B illustrate schematic circuit diagrams of gates shown as blocks 14 and 15 in Fig. 1.

In further explanation of the operation of the receiver circuit described thus far, reference is made to the chart of Fig. 5 and to the gates shown in Figs. 6A and 6B.

The first pair of blocks of the chart show in coordinate form the combined operation of the three discriminators A, B1 and B2 and gates 14 and 15. The frequencies $f1$, $f2$, $f3$ and $f4$ applied to discriminator A and the polarities of the pulse voltages at the discriminator output have been indicated as ordinates. Similar notations have been indicated as abscissae for the same frequencies and the pulse voltage polarities for discriminator B1 and discriminator B2. Within the blocks representing gates 14 and 15 are shown the frequencies for which the respective gates are either open or shut for any combination of coordinate polarities.

It is clear from Fig. 2 that the discriminator action of discriminator A produces negative pulses from frequencies $f1$ and $f2$ and positive pulses from frequencies $f3$ and $f4$. Similarly, discriminator B1 produces a negative pulse from $f1$ and positive pulses from $f2$, $f3$ and $f4$. Discriminator B2 produces negative pulses from frequencies $f1$, $f2$ and $f3$ and a positive pulse from $f4$.

Assuming for the moment that the gates 14 and 15 will operate as described above, attention is directed to the second pair of blocks. Voltage values have been assigned to various pulses in accordance with the values assumed in Fig. 2. For gate 14, −30 volt pulses from discriminator A open the gate for −15 and +15 volt pulses from discriminator B1 for frequencies $f1$ and $f2$ respectively. No pulses pass gate 14 for frequencies $f3$ and $f4$. Similarly for gate 15, +30 volt pulses from discriminator A open the gate for −15 and +15 volt pulses from discriminator B2 for frequencies $f3$ and $f4$ respectively and the gate passes no pulses for frequencies $f1$ and $f2$. When either gate passes no pulses from discriminator B1 or B2 this fact is indicated by a 0 within the respective block.

Finally, within the lowest block of the chart there is indicated the values of the pulse voltages appearing in channel B for the frequencies $f1$, $f2$, $f3$ and $f4$. These voltages are −15, +15, −15 and +15 volts respectively.

To the left of the block are indicated the voltage pulses appearing in channel A. The sum of the voltage pulses of channels A and B appear to the right of the block under the heading "Add CKT Volts." These voltages are the same as those shown in the middle column of Table III in Fig. 4 provided the gates 14 and 15 operate as assumed and as described. That the gates do so will now be demonstrated.

The two gates 14 and 15 of Figs. 6A and 6B respectively are identical in all respects except that (with the diodes polarized as shown) gate 14 opens upon the application of a −30 v. control voltage, whereas gate 15 opens upon the application of a +30 v. control voltage, both voltages being obtained from the output of discriminator A. The gating diodes should be properly connected to provide the correct control voltage polarities. When the diodes are positively biased for the high conduction or low resistance direction of current flow they are said to be open as is well known. When the diodes are negatively biased the gates are closed. With a 1:1 ratio of turns on all transformers, the voltage value of the output pulses are substantially the same as those of the input pulses and as indicated in the figures.

The shaping circuits 13 and 16 are provided to produce a sharp change between the marking and spacing conditions, and for clearness it will be assumed that each is designed so that the input and output voltages are substantially equal, though this is not essential.

It will be evident that proper operation of the receiver of Fig. 1 depends on the maintenance of the frequency relations shown in Fig. 2. The differences between the frequencies $f1$ to $f4$ are generally only a few hundred cycles per second, and the radiated mean carrier frequency may be 20 or 30 megacycles per second, for example, so a very slight drift in the radiated carrier frequency is sufficient completely to upset the operation of the discriminators. Thus automatic frequency control arrangements are usually necessary. The fact that the received frequency is continually changing between four values makes the conventional automatic frequency control arrangements impracticable. The arrangement according to the invention comprises a frequency changing modulator 17 connected to the output of the amplifier 5, and supplied from a local oscillator 18, the frequency of which is determined by a frequency control device or circuit 19 in such manner that the frequency of the output sideband from the modulator 17 is substantially the same whichever frequency of the series $f1$ to $f4$ is being received. The frequency control circuit 19 is operated by an adding circuit 20 connected to the outputs of the shapers 13 and 16. The adding circuit 20 supplies to the frequency control circuit 19 a potential equal to or proportional to the algebraic sum of the potentials at the outputs of the shapers. This algebraic sum has a different value corresponding to each of the four frequencies $f1$ to $f4$, as indicated by Table III, Fig. 4.

The frequency control circuit or device 19 may, for example, be a conventional reactance valve circuit connected to the oscillator 18, the arrangement being such that the frequencies generated are those given in the third column of Table III, for example. It will be seen that the frequency of the sideband produced by the modulator 17 will be 30 kilocycles per second in each case. This frequency will be called the "control frequency."

The output of the modulator 17 is connected to a conventional frequency discriminator 21 the characteristic of which is centered on the control frequency. The output voltage from the discriminator 21 operates a frequency control circuit 22 for the oscillator 4, the arrangement being such that any drift of the frequency of one of the incoming carrier waves (which will change the control frequency) causes the discriminator 21 to change the frequency of the oscillator 4 in such direction as to restore the control frequency substantially to its original value.

Instead of using a reactance valve for the control circuit 19, a conventional mechanical motor-operated frequency control may be used.

The stability of the oscillator 18 with the control circuit or device 19 should be such that the variations of any of the four frequencies produced are small compared with the differences between the frequencies $f1$ to $f4$. Any convenient type of oscillator may be used, and any other suitable means for changing the frequency can be adopted.

Figure 3:
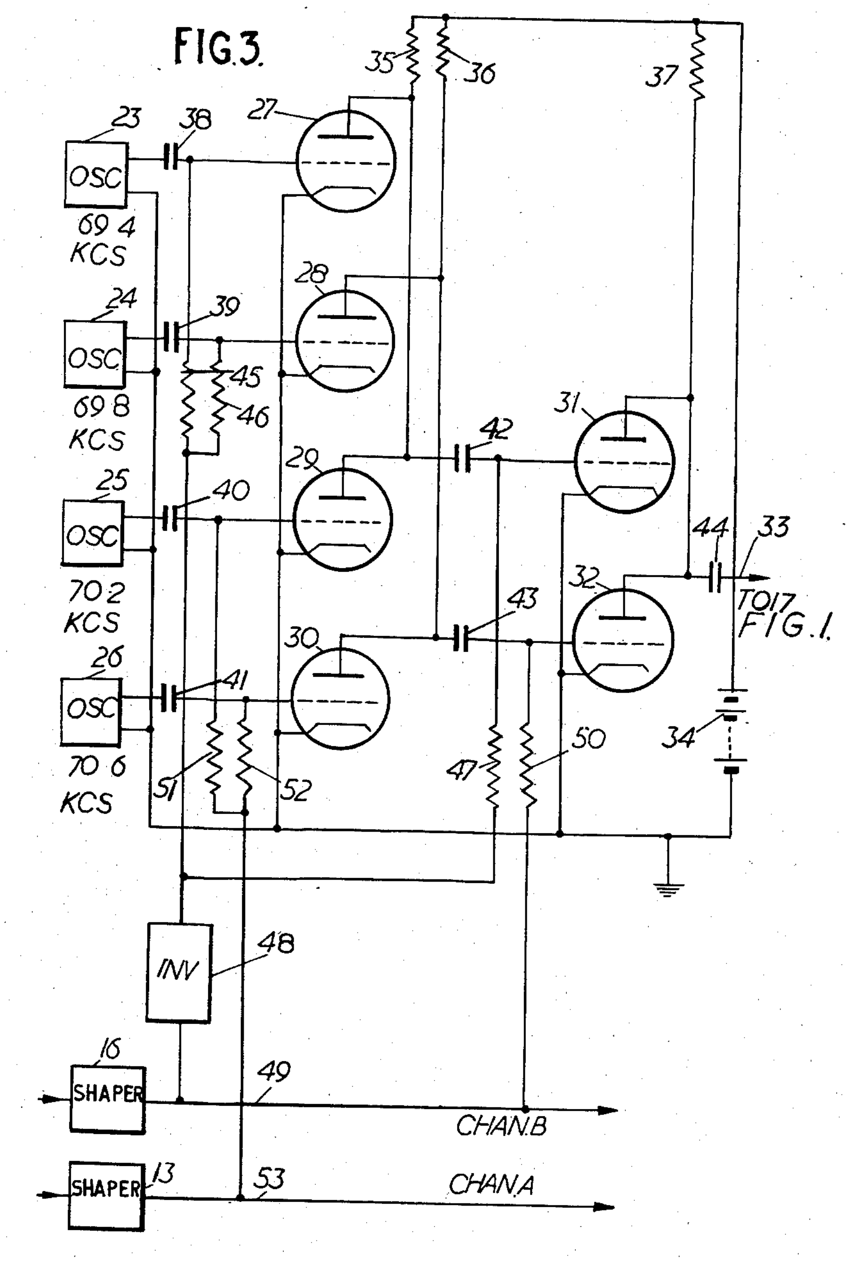
Fig. 3 shows a scchematic circuit diagram of a modification of part of Fig. 1.

Fig. 3 shows an arrangement which may be used instead of the elements 18, 19 and 20 of Fig. 1 to obtain automatically the proper frequency for the modulator 17. Four separate single-frequency oscillators 23, 24, 25 and 26 are provided which supply waves of frequencies 69.4, 69.8, 70.2 and 70.6 kilocycles per second, respectively. These oscillators should preferably be stable crystal-controlled oscillators. By means of two sets of gating valves 27, 28, 29, 30 and 31, 32, controlled by the potentials at the output of the shapers 13 and 16, the output of the appropriate one of the oscillators 23 to 26 is supplied to the output conductor 33 which is connected to the modulator 17, Fig. 1.

The cathodes of all the valves are connected to the grounded negative terminal of the high tension source 34 for the valves. The positive terminal of the source is connected to the anodes of valves 27 and 29 through a load resistor 35; to the anodes of valves 28 and 30 through a load resistor 36; and to the anodes of valves 31 and 32 through a load resistor 37.

The oscillators 23 to 26 are respectively connected through corresponding blocking capacitors 38 to 41 to the control grids of the valves 27 to 30; the anodes of the valves 27 and 29 are connected through a blocking capacitor 42 to the control grid of the valve 31; and the anodes of the valves 28 and 30 are connected through a blocking capacitor 43 to the control grid of the valve 32. The anodes of the valves 31 and 32 are connected to conductor 33 through a blocking capacitor 44.

The control grids of the valves 27, 28 and 31 are connected through respective leak resistors 45, 46 and 47, and through an inverter circuit 48, to the channel B output conductor 49 from the shaper 16. The control grid of the valve 32 is connected directly to this output conductor through a leak resistor 50. The control grids of the valves 29 and 30 are connected through respective leak resistors 51 and 52 to the channel A output conductor 53 from the shaper 13.

The inverter circuit 48 is a conventional circuit which produces at its output a potential of sign opposite to the potential applied to its input.

From Table I (Fig. 4), it will be seen that when the frequency $f1$ is sent out by the transmitter, both channels are in the spacing condition, so a negative potential is applied to both conductors 49 and 53. Thus valves 29, 30 and 32 are all blocked, but valves 27, 28 and 31 are all unblocked, since the inverter circuit 48 applies a positive potential to the control grids. Hence only the oscillator 23 has connection to the output conductor 33 through the unblocked valves 27 and 31.

Thus the frequency supplied to the modulator 17 (Fig. 1) is that indicated in the first line of Table III.

If the conditions set up in Fig. 3 corresponding to the transmitted frequencies $f2$, $f3$ and $f4$ be followed, it will be seen that in each case, the frequency supplied to the output conductor 33 is in accordance with Table III.

It will be understood that the voltages produced at the outputs of the shapers 13 and 16 may be given suitable values for controlling the valves 27 to 32: in particular the two shapers should preferably produce equal voltages in this case, so the amplifier 12 in Fig. 1 may be omitted. Also, if necessary, conventional means (not shown) may be provided for appropriately biasing the cathodes of all the valves.

The principal advantage of the arrangement of Fig. 3 is that the four frequencies generated will be very constant if crystal controlled oscillators are used. When, as in Fig. 1, the frequency of a single oscillator is varied, the arrangement is inherently less stable.

The stability of the automatic frequency control arrangement of Fig. 1 can also be improved by reducing the output sideband frequency from the modulator 17 to 11 kilocycles per second, for example. The characteristic of the discriminator 21 will of course be modified accordingly, and the frequencies in the third column of Table III and in Fig. 3 will then be changed to 88.4, 88.8, 89.2 and 89.6 kilocycles per second. It will be understood, however, that any other convenient series of frequencies may be used in the arrangements of Figs. 1 and 3.

It will be evident to those skilled in the art that the automatic frequency control arrangements according to the invention may be easily applied to twinplex receivers of the kind described in the article by Christopher Buff referred to above, in which groups of filters are used instead of discriminators for translating the received frequencies into the corresponding conditions of the two channels.

While the principles of the invention have been described above in connection with specific embodiments, and particular modifications thereof, it is to be clearly understood that this description is made only by way of example and not as a limitation on the scope of the invention.

What we claim is:

1. A receiver for a twinplex telegraph system in which signals, represented by the marking or spacing pulses of a first and a second telegraph channel, are simultaneously indicated by one of four received carrier waves each having different frequencies comprising: frequency changing means to change said carrier frequency waves to waves of lower frequencies having the same frequency separations as do the frequencies of said carrier waves; a first discriminator for recovering from said lower frequency waves the marking and spacing pulses representing the signals of said first channel; a second and a third discriminator for recovering marking and spacing pulses of said second channel; a first and second gating means connected to the outputs of said second and third discriminators respectively; control means connecting the output of said first discriminator to said second and third gating means for selecting the marking and spacing pulses representative of signals of said second channel; and means for combining said last named marking and spacing pulses to reproduce the signals of said second channel.

2. A receiver for a twinplex telegraph system according to claim 1 in which said control means gates said first gating means with control voltages of one polarity and gates said second gating means with voltages of the opposite polarity.

3. A receiver for a twinplex telegraph system in which signals, represented by the marking or spacing pulses of a first and a second telegraph channel, are simultaneously indicated by one of four received carrier waves each having different frequencies comprising: frequency changing means to change said carrier frequency waves to waves of lower frequencies having the same frequency separations as do the frequencies of said carrier waves; separate output circuits for said first and second channels; means for converting said waves of lower frequencies into pulses representing the signals of said first and second channels; means for directing said signal pulses into their corresponding output circuits; control means connected between both of said output circuits and said frequency changing means for applying to said frequency changing means a control frequency wave which maintains the four frequencies of said lower frequency waves substantially independent of variations in the frequencies of the received carrier waves.

4. A receiver for a twinplex telegraph system according to claim 3 wherein said frequency changing means comprises a first amplitude modulator, a first heterodyne oscillator connected thereto and means for controlling the frequency of said oscillator and wherein said control means comprises the combination of a second amplitude modulator and a second heterodyne oscillator connected thereto, means connecting said waves of lower frequency to said second amplitude modulator, means connected to said output circuits for combining the voltages of said signal pulses to produce a summation voltage, means controlled by said summation voltage and connected to said second heterodyne oscillator whereby the control frequency wave is maintained substantially constant, and means for applying said control frequency wave to said means for controlling the frequency of the first heterodyne oscillator.

5. A receiver for a twinplex telegraph system in which signals, represented by the marking or spacing pulses of a first and a second telegraph channel, are simultaneously indicated by one of four received carrier waves each having different frequencies comprising; frequency changing means to change said carrier frequency waves to waves of lower frequencies having the same frequency separations as do the frequencies of said carrier waves; separate output circuits for said first and second channels; means for converting said waves of lower frequencies into pulses representing the signals of said first and second channels; means for directing said signal pulses into their corresponding output circuits, means connected to said output circuits for combining the voltages of said signal pulses to produce a summation voltage; and means controlled by said summation voltage to maintain the frequencies of said lower frequency waves substantially independent of variations in the frequencies of the received carrier waves.

6. A receiver for a twinplex telegraph system according to claim 3 wherein said frequency changing means to change said carrier frequency waves to waves of lower frequencies comprises an amplitude modulator and a heterodyne oscillator and wherin said control means comprises a source of four heterodyning waves of predetermined frequency, and selecting means connected between said output circuits and said source for connecting one at a time the heterodyning waves to said heterodyne oscillator to stabilize the frequencies of said waves of lower frequencies.

7. A receiver for a twinplex telegraph system according to claim 6 wherein the selecting means comprises a plurality of gating circuits, means for deriving from said output circuits a control voltage having one of four different values and means to apply said voltage to said gating circuits to select one of said waves of predetermined frequency.

References Cited in the file of this patent

UNITED STATES PATENTS

| | | |
|---|---|---|
| 1,752,344 | Kelly | Apr. 1, 1930 |
| 2,275,401 | Norgaard | Mar. 3, 1942 |
| 2,341,649 | Peterson | Feb. 15, 1944 |
| 2,629,776 | Terry et al. | Feb. 24, 1953 |
| 2,676,203 | Phelps | Apr. 20, 1954 |
| 2,701,276 | Pletscher | Feb. 1, 1955 |
| 2,736,021 | Sunstein | Feb. 21, 1956 |